United States Patent [19]

Fujiyama et al.

[11] 4,427,738
[45] Jan. 24, 1984

[54] MAGNETIC RECORDING MEDIUM

[75] Inventors: Masaaki Fujiyama; Nobutaka Yamaguchi, both of Kanagawa, Japan

[73] Assignee: Fuji Photo Film Co., Ltd., Kanagawa, Japan

[21] Appl. No.: 274,565

[22] Filed: Jun. 17, 1981

[30] Foreign Application Priority Data

Jun. 17, 1980 [JP] Japan .................................. 55-81569

[51] Int. Cl.$^3$ ............................................... G11B 5/70
[52] U.S. Cl. ..................................... 428/323; 360/134;
427/128; 427/131; 428/328; 428/692; 428/694;
428/695; 428/900
[58] Field of Search ............... 428/692, 694, 695, 409,
428/900, 323, 328; 427/128, 131; 360/134–136

[56] References Cited

U.S. PATENT DOCUMENTS

| | | | |
|---|---|---|---|
| 3,993,824 | 11/1976 | Shirahata et al. | 428/900 |
| 4,071,654 | 1/1978 | Ogama et al. | 428/900 |
| 4,328,935 | 5/1982 | Steel | 427/131 |

FOREIGN PATENT DOCUMENTS

| | | | |
|---|---|---|---|
| 2352958 | 4/1975 | Fed. Rep. of Germany | 427/128 |
| 2501372 | 7/1976 | Fed. Rep. of Germany | 427/128 |
| 52-3286 | 1/1977 | Japan | 427/128 |

Primary Examiner—Ellis P. Robinson
Attorney, Agent, or Firm—Sughrue, Mion, Zinn, Macpeak and Seas

[57] ABSTRACT

A magnetic recording medium having a magnetic recording layer on one side of a non-magnetic base and a lubricant layer on the other side and which is used at a high tape speed of 2 to 10 m/sec. is disclosed. The lubricant layer is characterized by having a thickness of 2.5 to 5 $\mu$m and a surface roughness (Ra) of 0.33 to 0.72 $\mu$m.

8 Claims, 3 Drawing Figures

MAGNETIC RECORDING MEDIUM

FIELD OF THE INVENTION

This invention relates to a magnetic recording medium capable of magnetic recording and reproduction at a high tape speed of 2 to 10 m/sec., and more particularly, to endless video tape having an improved lubricant layer.

BACKGROUND OF THE INVENTION

The conventional endless tape used in car stereos is run in record or reproduce mode at a tape speed of 9.5 cm/sec. Endless video tape must be run at a speed of at least 2 m/sec., usually at least 5 m/sec., if the purpose is to record and reproduce video signals rather than audio signals. Running the conventional endless tape at a speed in the range of from 2 to 10 m/sec. has the following problems:

(1) Recording and reproduction of a video signal is impossible;

(2) The tape does not run consistently and within 30 hours, it becomes practically unfit for further running.

The first problem is that of the magnetic layer. This can be solved by using a magnetic Co-Fe base, $CrO_2$ or alloy powder as in ½ inch wide video tape. But to solve the second problem, a new technique has been necessary, because when the conventional endless tape is run at 2 to 10 m/sec. for 30 hours, wrinkles from cinching, abnormally high tape tension, and flaking of the lubricant layer make the tape unfit for further running.

SUMMARY OF THE INVENTION

Therefore, one object of this invention is to provide a magnetic recording medium having a magnetic layer capable of recording and reproducing video signals and which can be run at a high speed of 2 to 10 m/sec.

Another object of this invention is to provide a magnetic recording medium of the type described above which withstands more than 150 hours of running and which is free from the flaking of the lubricant layer, as well as from wrinkles due to cinching.

As a result of various studies to meet these objects, we have found that improvements of the lubricant layer is a key to a solution of the problem. First, we have found that a lubricant layer having a surface roughness (Ra) in the range of from 0.33 to 0.72 $\mu$m exhibits improved durability for a high tape speed of 2 to 10 m/sec. Second, we have found that a lubricant layer having the above defined surface roughness and which is 2.5 to 5 $\mu$m thick (the conventional thickness being 1 to 2 $\mu$m) exhibits not only improved durability but also resistance to flaking.

Therefore, this invention relates to a magnetic recording medium having a magnetic recording layer on one side of a non-magnetic base and a lubricant layer on the other side and which is used at a high tape speed of 2 to 10 m/sec., said lubricant layer having a thickness of 2.5 to 5 $\mu$m and a surface roughness (Ra) of 0.33 to 0.72 $\mu$m.

DETAILED DESCRIPTION OF THE INVENTION

Figure 1:
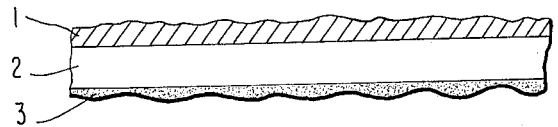
FIG. 1 is a cross-section of the conventional endless tape.

According to this invention, a magnetic recording layer is formed on one side of a non-magnetic base and a lubricant layer is formed on the other side of the base to reduce the friction and provide suitable slippage between the layers in a tape roll. The lubricant layer according to this invention comprises lubricant, binder and the like, preferably contains wax. The lubricant layer preferably contains graphite as lubricant, and molybdenum disulfide or talc powder may also be used as lubricant. The graphite comprises particles which preferably have an average diameter of 3 to 10 $\mu$m. Better results are obtained by using a diketone

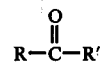

as wax in the lubricant layer. In the formula, R and R' which may be same or different, are each an aliphatic alkyl having 7 to 17 carbon atoms. Examples of the wax are preferably an aliphatic alkyl ketone such as

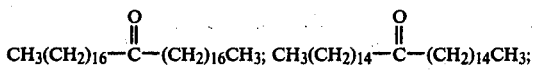

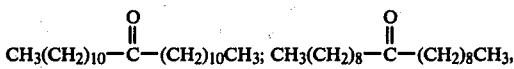

and the like. Diheptadecyl ketone of the formula

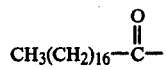

is more preferred because an even higher durability is obtained. The wax is preferably used in an amount of at least 0.5 wt. % based on the weight of lubricant (e.g., graphite). Examples of the binder are a vinyl chloride/vinyl acetate copolymer, vinyl chloride, polyurethane, vinyl chloride/acrylonitrile copolymer, cellulose derivative, polyisocyanate, epoxy resin, and mixtures thereof. The binder is used in an amount of about 30 to 300 parts by weight, preferably 50 to 200 parts by weight, based on 300 parts by weight of lubricant.

The magnetic recording layer according to this invention may be formed of a known composition containing a magnetic substance, binder, lubricant, abrasive, and dispersant. Examples of the magnetic substance are gamma-$Fe_2O_3$, $Fe_3O_4$, $CrO_2$, Co-modified gamma-$FeO_x$ (x=1.33 to 1.5), and Fe-Co-Ni alloy. Examples of the binder are a vinyl chloride/vinyl acetate copolymer, vinyl chloride, polyurethane, vinyl chloride/acrylonitrile copolymer, cellulose derivative, polyisocyanate, epoxy resin, and mixtures thereof. Examples of the lubricant are silicone oil, aliphatic acid, fluorine oil, and aliphatic acid ester. Examples of the abrasive are $Cr_2O_3$, $Al_2O_3$, SiC, and gamma-$Fe_2O_3$. Examples of the dispersant are lecithin, humic acid and oleic acid. Other additives include carbon black.

The non-magnetic base used in this invention may be made of any conventional material for non-magnetic base, and preferred examples include polyethylene terephthalate, triacetyl cellulose, diacetyl cellulose, vinyl chloride, polyimide, polypropylene, and polyethylene naphthalate. The base preferably has a strength of at least 40 kg/mm$^2$.

The magnetic recording medium having a lubricant layer formed on the reverse side of the base has the following advantages:

(1) Its durability is greatly improved;
(2) The flaking of the lubricant layer is minimum, so the number of dropouts is greatly reduced; and
(3) Because of reduced tape lead-out tension, tape elongation is small and no jitter occurs at a tape splice.

This invention is now described in greater detail by reference to the following example which is given here for illustrative purposes only and is by no means intended to limit the scope of the invention. In the example, all parts are by weight.

EXAMPLE 1

A polyethylene terephthalate base 15 μm thick was coated with a magnetic layer of the formulation indicated below to a dry thickness of 5 μm. The other side of the base was coated with a lubricant layer of the formulation indicated below. The resulting film was calendered and slit to ¼ inch wide as in the production of the conventional small video tape.

| Formulation of magnetic layer | |
|---|---|
| Cobalt-ferrite | 100 parts |
| (av. particle size = 0.45 μm, Hc = 610 Oe) | |
| Vinyl chloride-acetate copolymer | 20 parts |
| Nitrile rubber | 5 parts |
| Silicone oil | 0.2 parts |
| Carbon black | 10 parts |
| Cr$_2$O$_3$ | 5 parts |
| Polyisocyanate | 10 parts |
| Formulation of lubricant layer | |
| Graphite | 300 parts |
| Cellulose propionate | 80 parts |
| Urethane resin | 25 parts |

Twenty-six tape samples were prepared by repeating the above procedure but changing the thickness, average particle size and surface roughness of the lubricant layer, as well as the amount of wax used (for details, see Table 1 below). The samples were tested for various parameters according to the methods specified below.

(1) Durability

Figure 3:
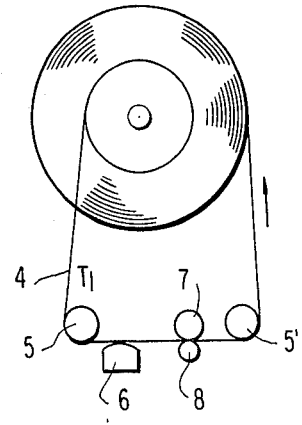
FIG. 3 schematically represents the transport system of a machine for testing the characteristics of endless video tape.

A tape pack (¼ inch wide × 50 m long) was set in a testing machine schematically shown in FIG. 3 and was run continuously at a speed of 5 m/sec. The time (in hours) required for the tape to show various defects (e.g., tape stop, breakage, and cinching) was measured.

(2) Flaking

The guide assembly of the machine used in the durability test (1) was visually checked for the presence of dirt.

(3) Dropout

NTSC (National Television System Committee) video signals were recorded and reproduced on each tape sample, and the number of dropouts greater than ½ H that took place in a reproduce mode was counted.

(4) Tape lead-out tension

The tape lead-out tension at a point T$_1$ in FIG. 3 was measured.

(5) Surface roughness (Ra)

The surface roughness is represented by Ra or center line average roughness as defined in JIS B0601. The Ra value was measured with "Surfcom 30B", a surface roughness meter of Tokyo Seimitsu Co., Ltd.

Figure 2:
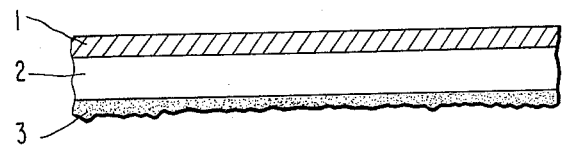
FIG. 2 is a cross-section of the endless video tape of this invention.

A cross-section of the conventional endless tape is shown in FIG. 1. A cross-section of the endless video tape of this invention is shown in FIG. 2, wherein 1 is a magnetic layer, 2 is a base, and 3 is a lubricant layer. The transport system of a machine used for testing the characteristics of endless video tape is schematically shown in FIG. 3 wherein 4 is endless video tape, 5 and 5' are a roller, 6 is a record/reproduce head, 7 is a pinch roller, and 8 is a capstan.

The results of the characteristic tests conducted above are set forth in Table 1. The data in the table is based on a tape speed of 5 m/sec., and "A", "B", "C" and "D" in the column of "longitudinal base strength" represent 20 kg/mm$^2$, 45 kg/mm$^2$, 40 kg/mm$^2$, and 52 kg/mm$^2$, respectively.

TABLE 1

| Sample No. | Longitudinal Base Strength | Lubricant Layer Thickness (μ) | Amount of Wax Added (%) | Average Particle Size (μ) | Surface Roughness (Ra) (μm) | Durability (hr) | Flaking of Lubricant Layer | Dropouts | Jitter at Tape Splice | Tape Lead-out Tension (g) | Wrinkles from Cinching |
|---|---|---|---|---|---|---|---|---|---|---|---|
| 1 | A | 0.8 | 0 | 5 | 0.22 | 5 x | yes | 100 < | yes | 120 | yes |
| 2 | B | 0.8 | 3 | 4 | 0.45 | 10 x | " | 50 | some | 100 | " |
| 3 | " | 1.5 | " | " | " | 50 x | " | 30 | " | 80 | some |
| 4 | " | 2.5 | " | " | " | 200 x | virtually absent | 15 | no | 50 | no |
| 5 | " | 3.0 | " | " | " | 300 < | no | 10 | " | 45 | " |
| 6 | " | 4.5 | " | " | " | " | " | 8 | " | 45 | " |
| 7 | " | 5.0 | " | " | " | 250 | " | 10 | " | 55 | " |
| 8 | " | 10.0 | 3 | " | " | 50 | yes | 35 | " | 70 | yes |
| 9 | " | 4.0 | 0 | " | " | 150 | virtually absent | 20 | " | 68 | no |
| 10 | " | " | 0.5 | " | " | 200 | " | 15 | " | 50 | " |
| 11 | " | " | 1 | " | " | 300 < | no | 10 | " | 45 | " |
| 12 | " | " | 2 | " | " | " | " | 9 | " | 45 | " |
| 13 | " | " | 3 | " | " | " | " | 9 | " | 40 | " |
| 14 | " | " | 5 | " | " | " | " | 9 | " | 37 | " |
| 15 | " | " | 7 | " | " | " | " | 9 | " | 40 | " |
| 16 | " | " | 3 | 1 | 0.21 | 1 > | yes | 100 < | — | 120 < | — |
| 17 | " | " | " | 3 | 0.33 | 300 < | virtually | 9 | no | 50 | no |

TABLE 1-continued

| Sample No. | Longitudinal Base Strength | Lubricant Layer Thickness (μ) | Amount of Wax Added (%) | Average Particle Size (μ) | Surface Roughness (Ra) (μm) | Durability (hr) | Flaking of Lubricant Layer | Drop-outs | Jitter at Tape Splice | Tape Lead-out Tension (g) | Wrinkles from Cinching |
|---|---|---|---|---|---|---|---|---|---|---|---|
| 18 | " | " | " | 6 | 0.48 | " | absent no | " | " | 45 | no |
| 19 | " | " | " | 10 | 0.72 | 150 | " | 17 | " | 58 | no |
| 20 | A | 4.0 | 3 | 4 | 0.45 | 170 | no | 10 | yes | 40 | no |
| 21 | C | " | " | " | " | 300 < | " | 8 | no | " | no |
| 22 | D | " | " | " | " | " | " | 8 | no | " | no |
| 23 | B | " | " | " | 0.40 | 300 < | " | 7 | " | 38 | " |
| 24 | " | " | " | " | 0.63 | 300 < | " | 9 | " | 45 | " |
| 25 | " | " | " | " | 0.85 | 130 x | some | 10 | " | 57 | some |
| 26 | " | " | 3 | 4 | 0.29 | 110 x | " | 15 | " | 59 | yes |

The data in Table 1 shows the following. Sample No. 1 which used a lubricant layer similar to that used in endless audio tape was inferior to most of the other samples with respect to durability (only 5 hrs), flaking of the lubricant layer, the number of dropouts, video quality (jitter) at tape splice, and wrinkles from cinching. Sample Nos. 2 to 8 used lubricant layers containing 3 wt. % of wax and having a thickness that varied from 0.8 to 10 μm. The thicker the lubricant layer, the more durable and resistant to flaking the layer was. Sample Nos. 9 to 15 used lubricant layers containing from 0 to 7 wt. % of wax based on the weight of graphite. The lubricant layers containing 0.5 wt. % or more wax had great durability and were highly resistant to flaking. Sample Nos. 16 to 19 used lubricant layers that contained graphite particles whose size was varied from 1 to 10 μm. Better results were obtained with a particle size of 3 μm or more, but a particle size of 10 μm was not effective in providing improved durability. Sample Nos. 20 to 22 used bases having a strength of from 20 to 52 kg/mm$^2$. Sample Nos. 21 and 22 using a stronger base were better than Sample No. 20 with respect to durability and video quality at tape splice. Sample Nos. 23 to 26 used lubricant layers having a surface roughness (Ra) varying from 0.29 to 0.85 μm. Higher Ra values produced better results, and Sample No. 26 using a lubricant layer having an Ra value of 0.29 μm was less durable and developed more wrinkles from cinching. But the same defects were found when the Ra was 0.85 μm. This indicates the need of adjusting the Ra within an optimum range which, when considering Sample No. 17, is from 0.33 to 0.72 μm.

As discussed in the foregoing, the magnetic recording medium achieves the best result when it uses a lubricant layer that contains wax and which has the thickness, surface roughness and particle size defined herein, and if it uses a strong base. But the objects of this invention are fully achieved when the lubricant layer has the thickness and surface roughness defined herein. The advantages of the magnetic recording medium of this invention are obtained when the tape speed relative to the fixed video head is in the range of from 2 to 10 m/sec., and they include high durability, minimum flaking of lubricant layer, small number of dropouts, high video quality at tape splice, low tape lead-out tension, absence of wrinkles due to cinching.

We confimed that the advantages of this invention are obtained at a tape speed of 2 to 10 m/sec. We also confirmed that similar results are obtained by using any type of wax wherein R and R' have 7 to 17 carbon atoms.

While the invention has been described in detail and with reference to specific embodiments thereof, it will be apparent to one skilled in the art that various changes and modifications can be made therein without departing from the spirit and scope thereof.

What is claimed is:

1. A magnetic recording medium which is used at a high tape speed of 2 to 10 m/sec, comprising a non-magnetic base, a magnetic recording layer on a first side of said base and a lubricant layer on a second side of said base, wherein said magnetic recording layer comprises magnetic particles dispersed in a binder, and wherein said lubricant layer has a thickness of 2.5 to 5 μm and a surface roughness (Ra) of 0.33 to 0.72 μm, and comprises a lubricant provided in a binder, wherein the binder is a synthetic resin binder in an amount of 30 to 300 parts by weight based on 300 parts of lubricant.

2. A magnetic recording medium as claimed in claim 1 wherein said lubricant layer is comprised of graphite.

3. A magnetic recording medium as claimed in claim 1 wherein said lubricant layer is comprised of molybdenum disulfide and talc powder.

4. A magnetic recording medium as claimed in claim 2 wherein said graphite is comprised of particles having an average diameter of from 3 to 10 μm.

5. A magnetic recording medium as claimed in claim 1 wherein said lubricant layer is comprised of a dialkyl ketone having the structural formula

wherein R and R' are independently aliphatic alkyls having 7 to 17 carbon atoms.

6. A magnetic recording medium as claimed in claim 5 wherein said dialkyl ketone is

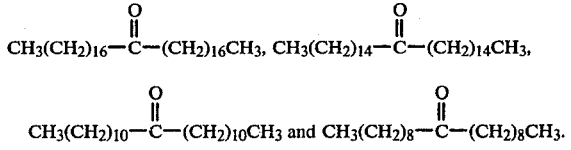

7. A magnetic recording medium as claimed in claim 5 wherein said dialkyl ketone is contained in an amount of at least 0.5% by weight based on the weight of lubricant.

8. A magnetic recording medium as claimed in claim 5 or 6 wherein said dialkyl ketone is diheptadecyl ketone which is contained within said lubricant layer in combination with graphite, with said ketone being contained in an amount of at least 0.5% by weight based on the weight on said graphite.

* * * * *